US006769729B1

United States Patent
Bruford et al.

(10) Patent No.: US 6,769,729 B1
(45) Date of Patent: Aug. 3, 2004

(54) AUTOMOTIVE TAILGATE WITH LIFT ASSIST SYSTEM-I

(75) Inventors: Stephen Lewis Bruford, West Bloomfield, MI (US); Jeffrey Alan Firzlaff, Royal Oak, MI (US); Scott G. Miller, Canton, MI (US); Ed Rybarczyk, Ypsilanti, MI (US); Duane A. Koehler, Livonia, MI (US); Glenn VanGelderen, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 10/604,075

(22) Filed: Jun. 25, 2003

(51) Int. Cl.[7] ............................................ B62D 33/023
(52) U.S. Cl. .................... 296/50; 296/57.1; 296/146.11; 49/386; 16/308
(58) Field of Search .......................... 296/50, 57.1, 60, 296/146.1, 146.8, 146.11; 49/386; 16/308

(56) References Cited

U.S. PATENT DOCUMENTS

| | | | |
|---|---|---|---|
| 2,984,517 A | | 5/1961 | Farrow et al. |
| 3,031,225 A | | 4/1962 | Saffer et al. |
| 3,166,783 A | * | 1/1965 | Mackie et al. ................. 16/302 |
| 3,336,070 A | | 8/1967 | Jackson |
| 4,143,904 A | | 3/1979 | Copper et al. |
| 5,358,301 A | | 10/1994 | Konchan et al. |
| 5,988,724 A | | 11/1999 | Wolda |
| 6,637,796 B1 | * | 10/2003 | Westerdale et al. ......... 296/57.1 |

* cited by examiner

*Primary Examiner*—D. Glenn Dayoan
*Assistant Examiner*—Patricia L. Engle
(74) *Attorney, Agent, or Firm*—Gigette M. Bejin

(57) ABSTRACT

An automotive tailgate includes a door adapted to pivot about a generally horizontal pivot axis, with the door including a shell defining an interior space. The door is pivoted upon bearings mounted upon bearing retainers located at each end of the door. A full floating torsion bar is provided and includes a first end rotationally grounded within the interior of the door shell and a second end engaged with and rotationally locked with one of the bearing inserts so that the torsion bar will be subjected to torsional loading as the door is pivoted. Because the torsion bar is full floating, the operation of the tailgate hinges will not be impaired even if the torsion bar were to become fractured.

16 Claims, 3 Drawing Sheets

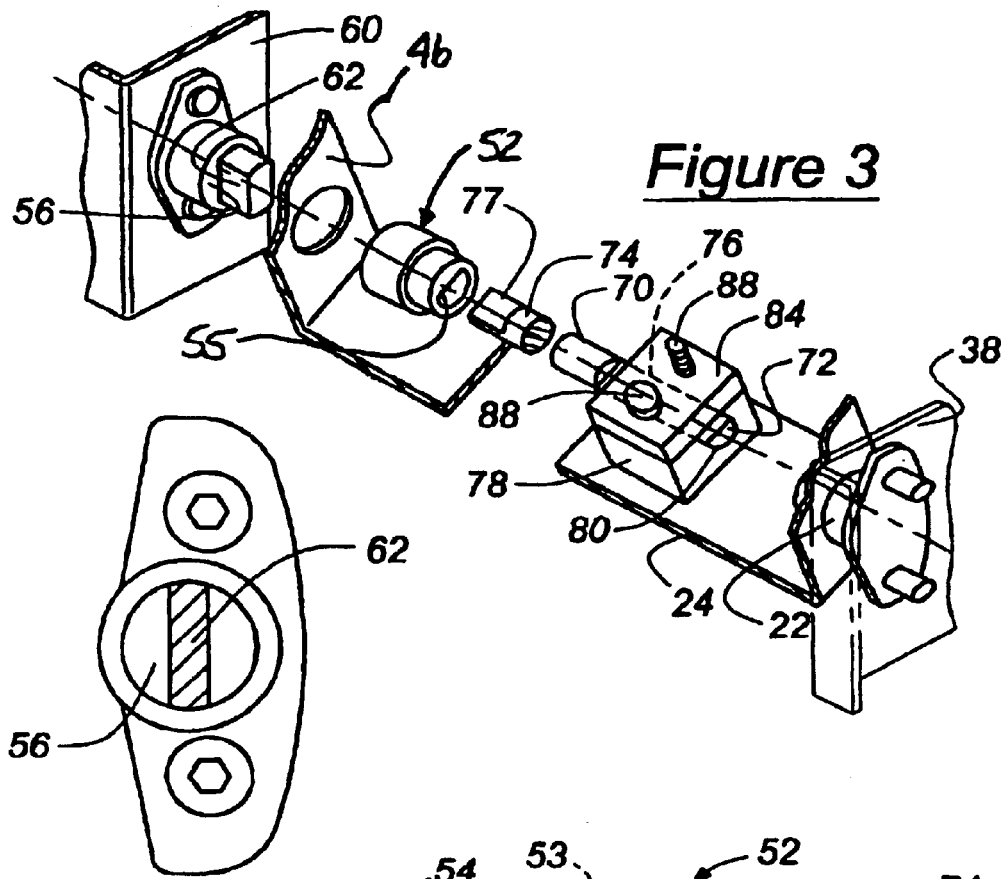
*Figure 3*
*Figure 4*
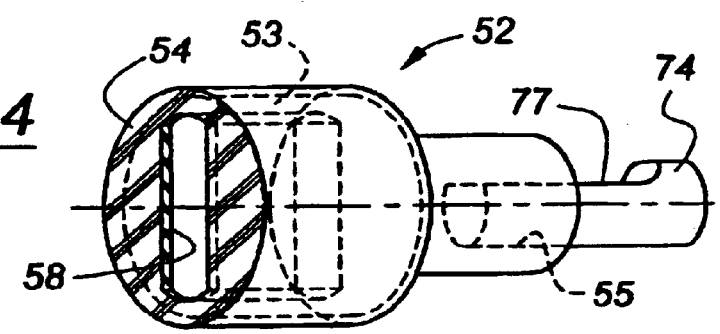
*Figure 5*

AUTOMOTIVE TAILGATE WITH LIFT ASSIST SYSTEM-I

BACKGROUND OF INVENTION

1. Field of the Invention

The present invention relates to a door or tailgate for vehicle such as a pickup truck, having a torsion bar for assisting the closure of the tailgate.

2. Disclosure Information

Tailgates used with large pickup trucks present a challenge to the operator of the truck insofar as the weight of such tailgates and the height of such vehicles frequently result in the necessity of expending considerable effort to close the tailgate. U.S. Pat. No. 5,358,301, which is shown in FIG. 6, discloses a torsion bar system for assisting the closure of a tailgate. Unfortunately, the system disclosed in the '301 patent suffers from several drawbacks. First, the system would have high cost because the torsion bar is itself used as a hinge pin and this necessitates that the torsion bar be sufficiently large to not only function in torsion, but also in shear so as to support the tailgate itself. Secondly, the fact that the torsion bar functions not only as a torsion element but also as a pivot for tailgate means that in the event that the torsion bar breaks, the tailgate's pivot function may be impaired, with the result that the tailgate could separate from the vehicle in a unwanted manner.

A torsion bar tailgate lift assist system according to the present invention solves the problems inherent in the previously described system, but at a lower cost, while providing a torsion bar which is full floating. This means that if the torsion bar of the present inventive system were to break, the pivoting function and retention of the tailgate to the body of the pickup truck would not be adversely affected.

SUMMARY OF INVENTION

An automotive closure panel includes a door, typically a tailgate adapted to pivot about a generally horizontal pivot axis, with the door having a shell defining an interior space. A first hinge bearing retainer is attached to a first end of the door and has a first bearing insert housed within the retainer. A first pivot post is rigidly attached to a structure such as a side pillar adjoining a first end of the pivot axis, with the pivot post engaging a bore formed in the interior of the said first bearing insert. A second hinge bearing retainer is attached to the second end of the door and has a second bearing insert housed therein. A second pivot post is rigidly attached to a structure such as a second side pillar adjoining a second end of the pivot axis. The second post engages the second bearing insert such that the second pivot post and the second bearing insert are rotationally locked. This means as the tailgate is pivoted, the second bearing insert will rotate within the second bearing retainer. In other words, the second bearing insert will rotate with respect to the second bearing retainer because the second bearing insert will not rotate at with respect to the tailgate. This means that the tailgate itself, including the second bearing retainer, will rotate about the second bearing insert.

The present automotive closure panel further includes a full floating torsion bar having a first end rotationally grounded within the interior of the door, and a second end engaged with and rotationally locked with the previously described second bearing insert such that the torsion bar will be subjected to torsional loading as the door is pivoted. The second pivot post is oriented so that the torsion bar is subjected to a minimal torsional load tending to open the door when the door is in a closed position. The orientation of the second pivot post further allows the torsion bar to be subjected to a maximum torsional load tending to close the door when the door is in a fully open position, which normally corresponds to about 90° of rotation from the closed position.

The torsion bar of the present system is situated such that the first end of the torsion bar is grounded within an anchoring member located within the interior of the door, wherein the anchoring member passes through an aperture of the door shell during assembly. The anchoring member may take a variety of forms such as a bracket, mounting block, or a pinch block. The anchoring member may be affixed to a portion of the first bearing retainer via a hinge bracket or the like, or directly to the first bearing retainer.

The first bearing insert and first pivot post are keyed in a manner used with 2003 model year pickup trucks produced by Ford Motor Company, so as to allow the closure panel to be removed from a vehicle when the panel has been opened to a predetermined position.

According to another aspect of the present invention, a method for constructing an automotive tailgate includes the steps of fabricating a door adapted to pivot about a generally horizontal pivot axis, with the door having a shell defining an interior space, and with the shell having a first end and a second end, and attaching first and second bearing retainers to the shell, with each of the bearing retainers housing a bearing insert. The present method further includes providing a first pivot post rigidly attached to a body structure adjoining a first end of the door shell when the door is in a closed position. The first pivot post engages a bore formed the interior of said first bearing insert. A second pivot post is attached to a pillar structure adjoining the second end of the door when the door or tailgate is in a closed position, with the second pivot post engaging the second bearing insert such that the second pivot post and second bearing insert are rotationally locked.

According to another aspect of the present invention, a cargo box for an automotive vehicle includes left and right pickup box sides, a first side pillar attached to the right pickup box side, and a second side pillar attached to the left pickup box side. A first pivot post is attached to the first side pillar, and a second pivot post is attached to the second side pillar. A tailgate is hingedly attached to the first and second pivot posts, with the tailgate having a full floating torsion bar lift assist. The torsion bar has a first end rotationally grounded within the interior of the tailgate, and a second end rotationally locked with the second pivot post such that the torsion bar will be subjected to torsional loading as the tailgate is pivoted to an open position.

Finally, according to the present invention, a full floating torsion bar is provided, with the bar housed entirely within the interior space of the door and with the torsion bar having a first end rotationally grounded within the interior of the door and a second end engaged with and rotationally locked with the second bearing insert such that the torsion bar will be subjected to torsional loading as the door is pivoted.

It is an advantage of the present invention that an automotive tailgate may be provided with a lift assist system having less weight than other known lift assist systems.

It is a further advantage of the present invention that the present lift assist system is less costly than known lift assist systems.

It is a further advantage of the present invention that the present lift assist system will not impair the basic functions of the tailgate even if the torsion bar should fail during normal operation of the vehicle.

It is a further advantage of the present invention that the torsion bar employed in the inventive lift assist system may be readily changed in diameter, or in length, or both, so as to alter the effective spring rate of the torsion bar, without the necessity of retooling the tailgate hardware. This change is not easily accommodated by prior art designs.

It is a further advantage that a vehicular door, such as a tailgate, equipped according to this invention has a self-contained torsion bar mechanism, allowing the tailgate to be removed without the use of tools.

Other advantages, as well as objects and features of the present invention, will become apparent to the reader of this specification.

BRIEF DESCRIPTION OF DRAWINGS

FIG. 3 is a blown-up perspective view of the tailgate lift assist system shown in FIGS. 1 and 2.

FIG. 4 illustrates a driver's side pivot post according to one aspect of the present invention.

FIG. 5 illustrates a pivot for a tailgate having an assist system according to the present invention.

DETAILED DESCRIPTION

Figure 1:
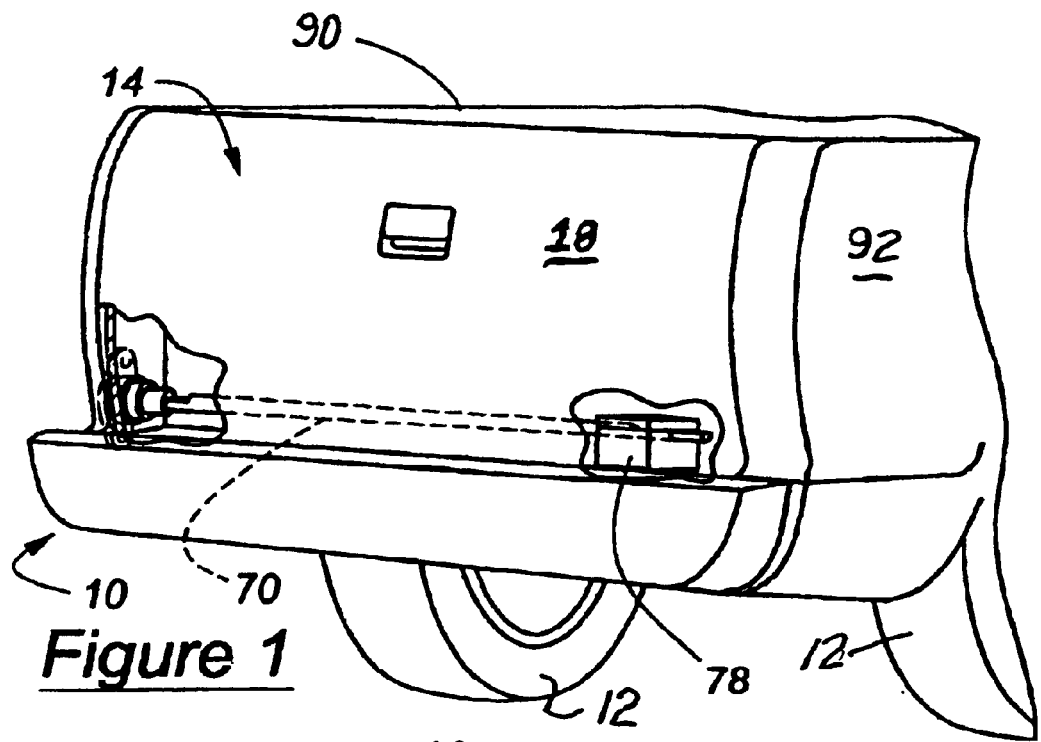
FIG. 1 is a perspective view of a pickup truck having a tailgate lift assist system according to the present invention.
Figure 2:
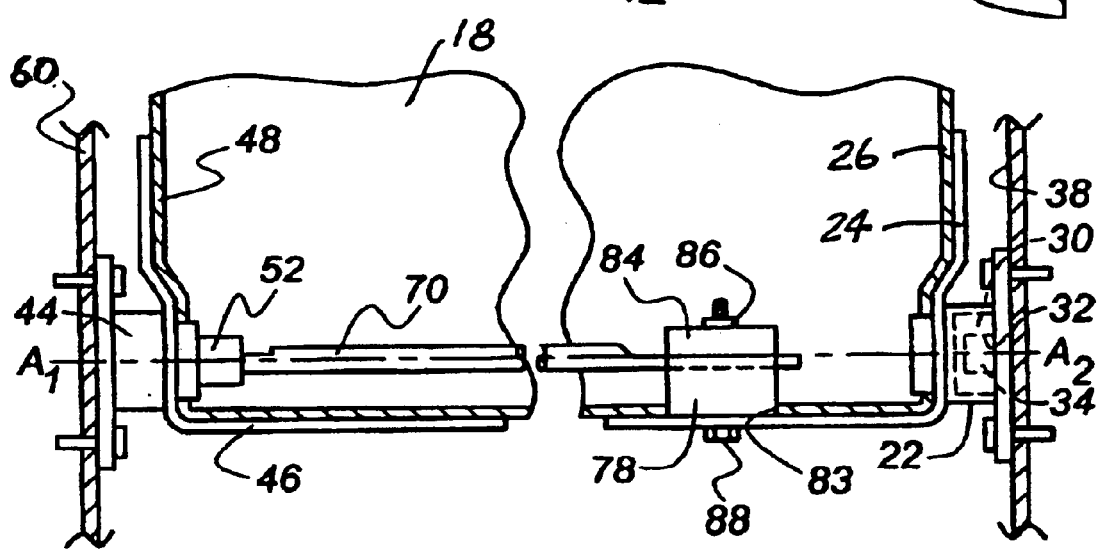
FIG. 2 is a cut-away plan view of a tailgate as shown in FIG. 1.
Figure 6:
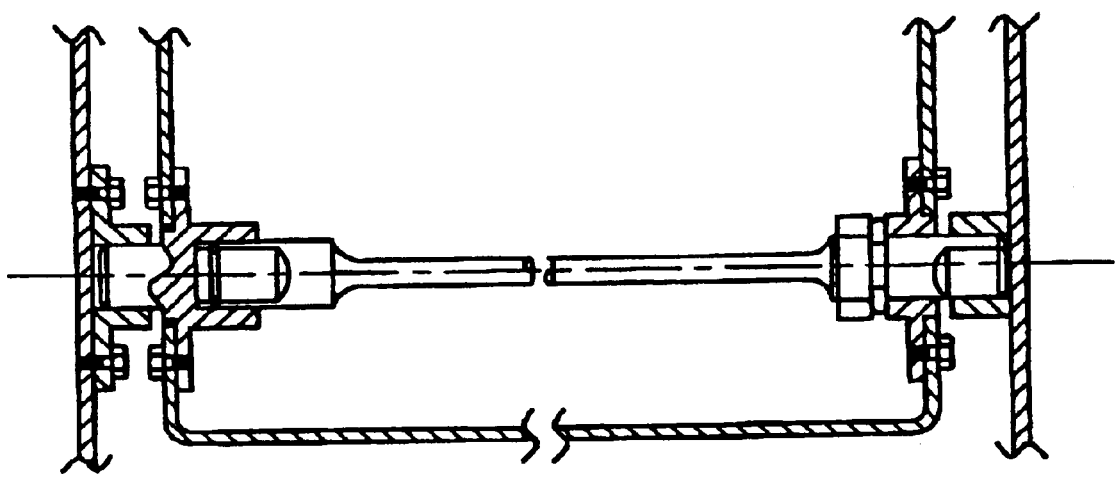
FIG. 6 illustrates a prior art tailgate assist system according to the present invention.

As shown in FIG. 1, vehicle 10 has rear roadwheels 12 and tailgate 14 including shell 18 and torsion bar 70. Tailgate 14 pivots about axis A1–A2 (FIG. 2). Note that torsion bar 70 does not extend across the entire width of tailgate 14. This means that the length of torsion bar 70 may easily changed, so as to change the effective spring rate of torsion bar 70 to compensate for changes in the weight of tailgate 14. Tailgate 14 is hingedly attached to a pickup box having a left pickup box side 90 and a right pickup box side 92.

FIGS. 2 and 3 illustrate various details of the present system. Shell 18 is pivoted upon two pivots which define the generally horizontal pivot axis shown as A1–A2 in FIG. 2. At the right side of vehicle 10, a first hinge bearing retainer 22 is applied to the first end 26 of shell 18. Bearing retainer 22 is cup-shaped and may be either mechanically joined or welded, or for that matter, molded from metal or plastic integrally with hinge bracket 24 which is applied to the outer or exterior surface of shell 18. First bearing insert 30 is located within hinge bearing retainer 22. First bearing insert 30 has bore 32 therein which allows first bearing insert 30 to engage first pivot post 34, which is rigidly attached to first side pillar 38, which is in turn rigidly attached to right pickup box side 92. First hinge bearing retainer 22 and first bearing insert 30, as well as first pivot post 34 are made in conventional fashion so as to allow tailgate 14 including shell 18 to be removed from vehicle 10 when tailgate 14 has been rotated to a prescribed partially open position.

Those skilled in the art will appreciate in view of this disclosure that the tailgate removal technique (i.e. permitting removal at a predetermined opening position lying between fully open and fully closed) described herein has been used in the past by Ford Motor Company and others and is intended to be adopted with the present system. This provides additional advantages because the right side hinge mechanism of tailgate 14 according to present invention may be made for the most part according to known methods with known materials with a resulting labor and materials saving over known alternative torsion bar assist systems. And, the vehicle operator will be able to remove tailgate 14 by using a familiar technique, thereby promotion owner satisfaction.

At the second end 48 of shell 18, second hinge bearing retainer 44, which too is cup-shaped, is mounted upon hinge bracket 46, in a manner previously described with respect to first hinge bearing retainer 22. Second bearing insert 52 is rotatably received within second hinge bearing retainer 44. Second bearing insert 52 includes a rigid substrate such as a metallic or non-metallic material having a generally cylindrical outer surface 53, which preferably has a dense resin coating 54 applied thereto to combat corrosion and to permit a close fit between the inner diameter of second hinge bearing retainer 44 and the outer diameter of second bearing insert 52. Bearing insert 52 also has bore 55(FIG. 5) to permit torsion bar 70 to be slidably engaged therewith. The slidable engagement should preferably be a press fit. Bore 55 has a non-circular cross section which matches a non-circular cross section of torsion bar 70. Torsion bar 70 has first end 72 with a flat surface 76 formed thereon and a second end 74 with a flat surface 77 formed thereon. Flat surface 77 allows torsion bar 70 and second bearing insert 52 to be rotationally locked. In other words, torsion bar 70 and second bearing insert 52 cannot rotate with respect to each other. Moreover, rotation of second bearing insert 52 with respect to the body of vehicle 10 and more precisely, with respect to second pivot post 56, is prevented by the cooperation of oblong bore 58 formed in second bearing insert 52, which receives an oblong projection 62 extending from the base of second pivot post 56. As shown in FIGS. 2 and 3, second pivot post 56 is attached to second side pillar 60 by fasteners such that the pivot post cannot rotate with respect to side pillar 60, which is rigidly attached to left pickup box side 90 (FIGS. 1 & 3). As noted above, second bearing insert 52 is overmolded, preferably with a plastic 54 such as the urethane composition currently used for automotive bushings, so as to prevent corrosion of second bearing insert 52, while allowing a close, noise free fit of insert 52.

The present torsion bar system is said to be full floating because even torsion bar 70 were to break, second bearing insert 52 will not become disengaged from second hinge bearing retainer 44 and second pivot post 56. This full floating feature means that the pivoting function of the tailgate system and, for that matter, the retention of tailgate 14 upon vehicle 10, will not be adversely affected by breakage of torsion bar 70.

First end 72 of torsion bar 70 is rotationally grounded within the interior of shell 18 by means of an anchoring member 78 such as a bracket or the like (shown in FIG. 2 as a pinch block), which is mounted to hinge bracket 24. Anchoring member 78 extends into the interior of shell 18 through aperture 82. Where anchoring member 78 is a pinch block, pinch block 78 has a bore 80 formed therein. Bore 80 has a semi circular cross section. Pinch block 78 further has a torsion bar retainer 84 which is maintained in place by means of fasteners such as rivet 86 and bolt 88. Once fasteners 86 and 88 have been placed, torsion bar 70 is grounded or non-rotationally locked to pinch block 78, and as a result, pivoting of shell 18 about axis A1–A2 will cause torsion bar 70 to be subjected to torsional windup sufficient to produce the desired assist for the operator of the vehicle opening or closing tailgate 14.

The present invention may be employed as follows. After a portion of shell 18 including ends 26 and 48 has been formed, hinge brackets 24 and 46 including first and second hinge bearing retainers 22 and 44 will be applied to the exterior surface of shell 18 either by welding, bonding, riveting, bolting or by other means known to those skilled in the art and suggested by this disclosure. In a preferred embodiment, hinge bracket 24 includes pinch block 78, which passes into the interior of the tailgate through port 83 formed in shell 18. Alternatively, first and second hinge bearing retainers 22 and 44 could be integrally formed with the ends of shell 18. These and other such modifications will be suggested to those skilled in the art by this disclosure. Once second hinge bearing retainer 44 has been mounted to shell 18, torsion bar 70 may be slidably engaged with both pinch block 78 and with second bearing insert 52. The slidable engagement between end 74 of torsion bar 70 and end bore 55 formed in second bearing insert 52 would normally be to be an interference fit sufficient to assure the retention of torsion bar 70 within bore 55 with a minimum retention force of about 100 lbs. In any event, once torsion bar 70 has been mounted within pinch block 78 and pinch bolt 88 has been tightened, torsion bar 70 is not free to move axially.

Engagement of end 74 of torsion bar 70 with bore 80 of pinch block 78 is promoted by a chamfered section of bore 80 at the end of pinch block 78 which is first entered by bar end 74. Engagement of torsion bar 70 with pinch block 78 is further promoted by the fact that torsion bar 70 is a straight rod.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive closure panel, comprising:
    a door adapted to pivot about a generally horizontal pivot axis, with said door having a shell defining an interior space within said door;
    a first hinge bearing retainer attached to a first end of said door and having a first bearing insert housed within said retainer;
    a first pivot post rigidly attached to a structure adjoining a first end of said pivot axis, with said pivot post engaging a bore formed in the interior of said first bearing insert;
    a second hinge bearing retainer attached to a second end of said door and having a second bearing insert housed therein;
    a second pivot post rigidly attached to a structure adjoining a second end of said pivot axis, with said second pivot post engaging said second bearing insert such that said second pivot post and said second bearing insert are rotationally locked; and
    a full floating torsion bar having a first end rotationally grounded within the interior space of said door, and a second end engaged with and rotationally locked with said second bearing insert such that said torsion bar will be subjected to torsional loading as said door is pivoted.

2. An automotive closure panel according to claim 1, wherein said torsion bar is subjected to a minimal torsional load tending to open the door when the door is in a closed position.

3. An automotive closure panel according to claim 1, wherein said torsion bar is subjected to a maximum torsional load tending to close the door when the door is in a fully open position.

4. An automotive closure panel according to claim 1, wherein said first end of said torsion bar is grounded to an anchoring member located within the interior of said door.

5. An automotive closure panel according to claim 4, wherein said anchoring member is affixed to a portion of said first hinge bearing retainer.

6. An automotive closure panel according to claim 4, wherein said torsion bar is a straight rod, with the first end of said torsion bar being affixed to an anchoring member located within the interior of said door.

7. An automotive closure panel according to claim 1, wherein said second bearing insert comprises a metallic core overmolded with plastic.

8. An automotive closure panel according to claim 1, wherein said first end of said torsion bar is grounded to an anchoring member located within the interior of said door.

9. An automotive closure panel according to claim 1, wherein said first bearing insert and first pivot post are keyed so as to allow said closure panel to be removed from a vehicle when the panel has been opened to a predetermined position.

10. An automotive tailgate, comprising:
    a door adapted to pivot about a generally horizontal pivot axis, with said door having a shell defining an interior space;
    a first cup-shaped hinge bearing retainer attached to a first end of said door and having a first bearing insert housed within said retainer;
    a first pivot post rigidly attached to a pillar structure adjoining said first end of said door when the door is in a closed position, with said pivot post engaging a bore formed in the interior of said bearing insert;
    a second cup-shaped hinge bearing retainer attached to a second end of said door and having a second bearing insert housed therein;
    a second pivot post rigidly attached to a pillar structure adjoining said second end of said door when the door is in a closed position, with said second pivot post slidably engaging said second bearing insert such that said second pivot post and said second bearing insert are rotationally locked; and
    a full floating torsion bar housed entirely within the interior space of the door, with said torsion bar having a first end rotationally grounded within the interior of said door, and a second end slidably engaged with and rotationally locked with said second bearing insert such that said torsion bar will be subjected to torsional loading as said door is pivoted.

11. An automotive tailgate according to claim 10, wherein said torsion bar is subjected to a minimal torsional load tending to open the door when the door is in a closed position.

12. An automotive tailgate according to claim 10, wherein said torsion bar is subjected to a maximum torsional load tending to close the door when the door is in a fully open position.

13. An automotive tailgate according to claim 10, wherein said first end of said torsion bar is grounded to an anchoring member located within the interior of said door, with said anchoring member being fastened to a portion of said first hinge bearing retainer such that the anchoring member passes into the interior of the tailgate through a port formed in said shell.

14. An automotive tailgate according to claim 10, wherein said first end of said torsion bar is grounded to an anchoring member located within the interior of said door.

15. An automotive tailgate according to claim 10, wherein said first bearing insert and first pivot post are keyed so as to allow said tailgate to be removed from a vehicle when the panel has been opened to a predetermined position.

16. A method for constructing an automotive tailgate, comprising the steps of:

fabricating a door adapted to pivot about a generally horizontal pivot axis, with said door having a shell defining an interior space, and with said shell having a first end and a second end;

attaching a first hinge bearing retainer to said first end of said shell, and positioning a first bearing insert within said retainer;

providing a first pivot post rigidly attached to a body structure adjoining said first end of said shell when the door is in a closed position, with said first pivot post engaging a bore formed in the interior of said first bearing insert;

providing a second hinge bearing retainer attached to a second end of said shell and having a second bearing insert housed therein;

providing a second pivot post rigidly attached to a pillar structure adjoining said second end of said door when the door is in a closed position, with said second pivot post engaging said second bearing insert such that said second pivot post and said second bearing insert are rotationally locked; and providing a full floating torsion bar housed entirely within the interior space of the door, with said torsion bar having a first end rotationally grounded within the interior of said door, and a second end engaged with and rotationally locked with said second bearing insert such that said torsion bar will be subjected to torsional loading as said door is pivoted.

* * * * *